United States Patent
Richmann et al.

(10) Patent No.: US 7,933,827 B2
(45) Date of Patent: Apr. 26, 2011

(54) MULTI-PARALLEL ARCHITECTURE AND A METHOD OF USING THE SAME

(75) Inventors: James N. Richmann, Lewes, DE (US); Daniel F. Moore, New Haven, CT (US); John T. Hughes, Jr., Stratford, CT (US); Stuart Serkin, Fairfield, CT (US); Timothy Vincent, Shelton, CT (US); Peter J. Martyn, Ridgewood, NJ (US); Mark DeNat, Bedford, NY (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 1622 days.

(21) Appl. No.: 10/206,892

(22) Filed: Jul. 25, 2002

(65) Prior Publication Data
US 2003/0229568 A1   Dec. 11, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2006.01)

(52) U.S. Cl. .............. 705/37; 705/35; 705/36; 705/39; 705/44

(58) Field of Classification Search ............... 705/35–45
See application file for complete search history.

(56) References Cited

U.S. PATENT DOCUMENTS

| | | | | |
|---|---|---|---|---|
| 5,905,974 A | * | 5/1999 | Fraser et al. | 705/36 R |
| 5,924,082 A | * | 7/1999 | Silverman et al. | 705/37 |
| 6,278,982 B1 | * | 8/2001 | Korhammer et al. | 705/36 R |
| 6,442,533 B1 | * | 8/2002 | Hinkle | 705/36 R |
| 6,820,069 B1 | | 11/2004 | Kogan et al. | 706/46 |
| 7,177,833 B1 | * | 2/2007 | Marynowski et al. | 705/38 |
| 7,496,533 B1 | * | 2/2009 | Keith | 705/37 |
| 2002/0156716 A1 | * | 10/2002 | Adatia | 705/37 |
| 2003/0009413 A1 | * | 1/2003 | Furbush et al. | 705/37 |
| 2004/0143542 A1 | * | 7/2004 | Magill et al. | 705/37 |

OTHER PUBLICATIONS

"Tekelec Announces Advanced Signaling Architecture—Tekware", Business Wire, New York: Jun. 4, 2002, p. 1.*

* cited by examiner

*Primary Examiner* — Ella Colbert
*Assistant Examiner* — Hai Tran
(74) *Attorney, Agent, or Firm* — Fish & Richardson P.C.

(57) ABSTRACT

Multiple securities processors each process attributable security interest messages generated by market participants. Each of these attributable security interest messages relates to a specific security chosen from a plurality of securities traded on the securities trading system, such that each individual security is assigned to one or more of the securities processors. An order routing system routes each attributable security interest message to one of the securities processors.

76 Claims, 7 Drawing Sheets

MULTI-PARALLEL ARCHITECTURE AND A METHOD OF USING THE SAME

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002.

BACKGROUND

This invention relates to electronic-based securities trading, and more particularly to processing and displaying of information relating to electronic securities trading.

Electronic equity markets, such as The Nasdaq Stock Market™ collect, aggregate, and display pre-trade information to market makers. In The Nasdaq Stock Market™, for example, this pre-trade information can take the form of a quote that represents a single or an aggregate of same-priced principal or agency orders. A market, such as The Nasdaq Stock Market™ also provides trading platforms through which market participants may trade securities in the marketplace.

SUMMARY

According to an aspect of this invention, multiple securities processors each process attributable security interest messages generated by market participants. These attributable security interest messages relate to a specific security chosen from a plurality of securities traded on a securities trading system, such that each individual security is assigned to one or more of the securities processors. An order routing system routes each attributable security interest message to one of the securities processors.

One or more of the following features may also be included. Each securities processor includes a prematching process for validating an attributable security interest message placed by a market participant.

A matching queue receives the validated attributable security interest message from the prematching process, and queues it for subsequent matching. The matching queue is a first-in, first-out queue maintained on a non-volatile memory.

The attributable security interest message is a security order and the prematching process includes a order entry process. This order entry process includes a validity determination process that receives the security order and validates it to confirm that it is eligible for matching. The order entry process includes an order writing process for writing the validated security order to the matching queue.

The attributable security interest message is a security quote and the prematching process includes a quote entry process. This quote entry process includes a validity determination process that receives the security quote and validates it to confirm that it is eligible for matching. The quote entry process includes an quote writing process for writing the validated security quote to the matching queue.

A matching process obtains the validated attributable security interest message from the matching queue and compares it with previously-validated attributable security interest messages to determine if a match occurs between the validated attributable security interest message and one of the previously-validated attributable security interest messages.

A delivery authorization process, responsive to the matching process determining that a match exists between the validated attributable security interest message and one of the previously-validated attributable security interest messages, requests a transaction authorization from the market participant. An execution reporting process, which is responsive to the delivery authorization process receiving a transaction authorization message from the market participant, generates a trade authorization message concerning the attributable security interest messages matched by the matching process. This trade authorization message is provided to a trade execution process.

The matching process includes an order management process for managing the validated attributable security interest messages obtained from the matching queue. The order management process is configured to process the attributable security interest messages that are supervisory commands.

The matching process includes an order book, responsive to the order management process, for storing the validated attributable security interest messages obtained from the matching queue. This order book is maintained on a main memory device and is exclusively accessible by the order management process. The order management process is configured to remove from the order book any attributable security interest messages that were matched by the matching process. An activity log file management process, responsive to the order management process, maintains an activity log file that specifies the chronological changes made to the order book by the order management process.

An order file builder process accesses the activity log file, such that the order file builder process uses the chronological change information included in the order activity log file to generate an order book recovery file. A match log file management process, responsive to the order management process, maintains a match log file that specifies the matches made by the matching process.

The order routing system includes a configurable look-up table that has assignment entries that assign each of a plurality of securities to one or more securities processors in the system. Whenever an attributable security interest message is received that involves a specific security, a security look-up process accesses the configurable look-up table to determine which securities processor the specific security is assigned to. Once determined, a messaging process, which is responsive to the security look-up process, sends the received attributable security interest message to the securities processor to which the specific security is assigned.

The assignment entries include security-specific entries that assign a single security to a specific securities processor, such that the specific securities processor processes received attributable security interest messages concerning the single security and other securities assigned to the specific securities processor. The assignment entries include dedicated entries that assign a single security to a dedicated securities processor, such that the dedicated securities processor only processes received attributable security interest messages concerning the single security. The assignment entries include id-range entries that assign a range of securities to a specific securities processor. The assignment entries include floating entries that assign a single security to the next-available securities processor.

The configurable look-up table includes a specific entry table and a rule entry table.

The specific entry table includes one or more security-specific entries that assign a single security to a specific securities processor, such that the specific securities processor processes received attributable security interest messages concerning the single security and other securities assigned to the specific securities processor. The specific entry table includes one or more dedicated entries that assign a single security to a dedicated securities processor, such that the dedicated securities processor only processes received attributable security interest messages concerning the single security.

The rule entry table includes one or more id-range entries that assign a range of securities to a specific securities processor. The rule entry table includes one or more floating entries that assign a single security to the next-available securities processor.

The security look-up process is configured to first access the specific entry table to determine if the specific entry table includes an assignment entry for the specific security associated with the received attributable security interest message, such that the rule entry table is subsequently accessed if the appropriate assignment entry is not included in the specific entry table.

A trade data output process transmits trade data to recipients concerning the processing of the received attributable security interest message.

According to a further aspect of this invention, a parallel processing method includes processing, on a plurality of securities processors, attributable security interest messages generated by market participants. Each attributable security interest message relates to a specific security chosen from a plurality of securities traded on a securities trading system, such that each individual security is assigned to one or more of the securities processors. Each attributable security interest message is routed to one of the securities processors.

One or more of the following features may also be included. An attributable security interest message placed by a market participant on a securities trading system is validated.

The validated attributable security interest message is queued on a matching queue for subsequent matching. This matching queue is a first-in, first-out queue maintained on a nonvolatile memory.

The attributable security interest message is a security order and validating includes receiving the security order and validating it to confirm that it is eligible for matching. Validating further includes writing the validated security order to the matching queue.

The attributable security interest message is a security quote and validating includes receiving the security quote and validating it to confirm that it is eligible for matching. Validating further includes writing the validated security quote to the matching queue.

The validated attributable security interest message is then obtained from the matching queue, and compared with previously-validated attributable security interest messages to determine if a match occurs between it and one of the previously-validated attributable security interest messages.

A transaction authorization is requested from the market participant whenever a match exists between the validated attributable security interest message and one of the previously-validated attributable security interest messages. A trade authorization message is generated concerning the matched attributable security interest messages in response to receiving a transaction authorization message from the market participant, This trade authorization message is provided to a trade execution process.

The validated attributable security interest messages obtained from the matching queue are managed. The attributable security interest message is a supervisory command.

The validated attributable security interest messages obtained from the matching queue are stored on an order book. Any attributable security interest messages that were matched are removed from the order book.

An activity log file is maintained that specifies the chronological changes made to the order book. The chronological change information included in the activity log file is accessed and used to generate an order book recovery file. A match log file is maintained that specifies the attributable security interest messages that were matched.

A configurable look-up table is accessed in response to a received attributable security interest message involving a specific security. The configurable look-up table includes assignment entries that assign each of a plurality of securities to one or more securities processors. The securities processor that the specific security is assigned to is then determined. The received attributable security interest message is sent to the securities processor to which the specific security is assigned.

One or more of the following features may also be included. Trade data concerning the processing of the received attributable security interest message is transmitted to recipients. The assignment entries include security-specific entries that assign a single security to a specific securities processor, such that the specific securities processor processes received attributable security interest messages concerning the single security and other securities assigned to the specific securities processor. The assignment entries include dedicated entries that assign a single security to a dedicated securities processor, such that the dedicated securities processor only processes received attributable security interest messages concerning the single security. The assignment entries include id-range entries that assign a range of securities to a specific securities processor. The assignment entries include floating entries that assign a single security to the next-available securities processor.

The configurable look-up table includes a specific entry table and a rule entry table.

The specific entry table includes one or more security-specific entries that assign a single security to a specific securities processor, such that this specific securities processor processes received attributable security interest messages concerning the single security and other securities assigned to the specific securities processor. The specific entry table includes one or more dedicated entries that assign a single security to a dedicated securities processor, such that the dedicated securities processor only processes received attributable security interest messages concerning the single security.

The rule entry table includes one or more id-range entries that assign a range of securities to a specific securities processor. The rule entry table includes one or more floating entries that assign a security to the next-available securities processor.

The specific entry table is first accessed to determine if it includes an assignment entry for the specific security associated with the received attributable security interest message. If it doesn't, the rule entry table is subsequently accessed.

According to a further aspect of this invention, a computer program product residing on a computer readable medium has a plurality of instructions stored on it. When executed by the processor, these instructions cause that processor to process, on a plurality of securities processors, attributable security interest messages generated by market participants. Each attributable security interest message relates to a specific security chosen from a plurality of securities traded on a securities trading system, such that each individual security is assigned to one or more of the securities processors. Each attributable security interest message is routed to one of the securities processors.

One or more of the following features may also be included. The computer program product includes instructions to validate an attributable security interest message placed by a market participant. The validated attributable security interest message is queued on a matching queue for subsequent matching. This validated attributable security interest message is then obtained from the matching queue and compared with previously-validated attributable security interest messages to determine if a match occurs between it and one of the previously-validated attributable security interest messages.

A configurable look-up table is accessed in response to a received attributable security interest message involving a specific security. This configurable look-up table includes assignment entries that assign each of a plurality of securities to one or more securities processors. A determination is made concerning which securities processor the specific security is assigned to. This received attributable security interest messages is then sent to the securities processor to which the specific security is assigned.

One or more advantages can be provided from the above. By splitting the processing of trades amongst numerous securities processors, system throughput can be increased. In addition, by making this routing table easily reconfigurable, the assignment of securities to specific securities processors can be varied in response to changes in system use. Further, as the routing table allows additional securities processors to be added and tested prior to being put into actual use, system testing is simplified and system stability is enhanced. Additionally, the use of modular securities processors allows for a system that can grow and expand in accordance with its needs.

DETAILED DESCRIPTION

Figure 1:
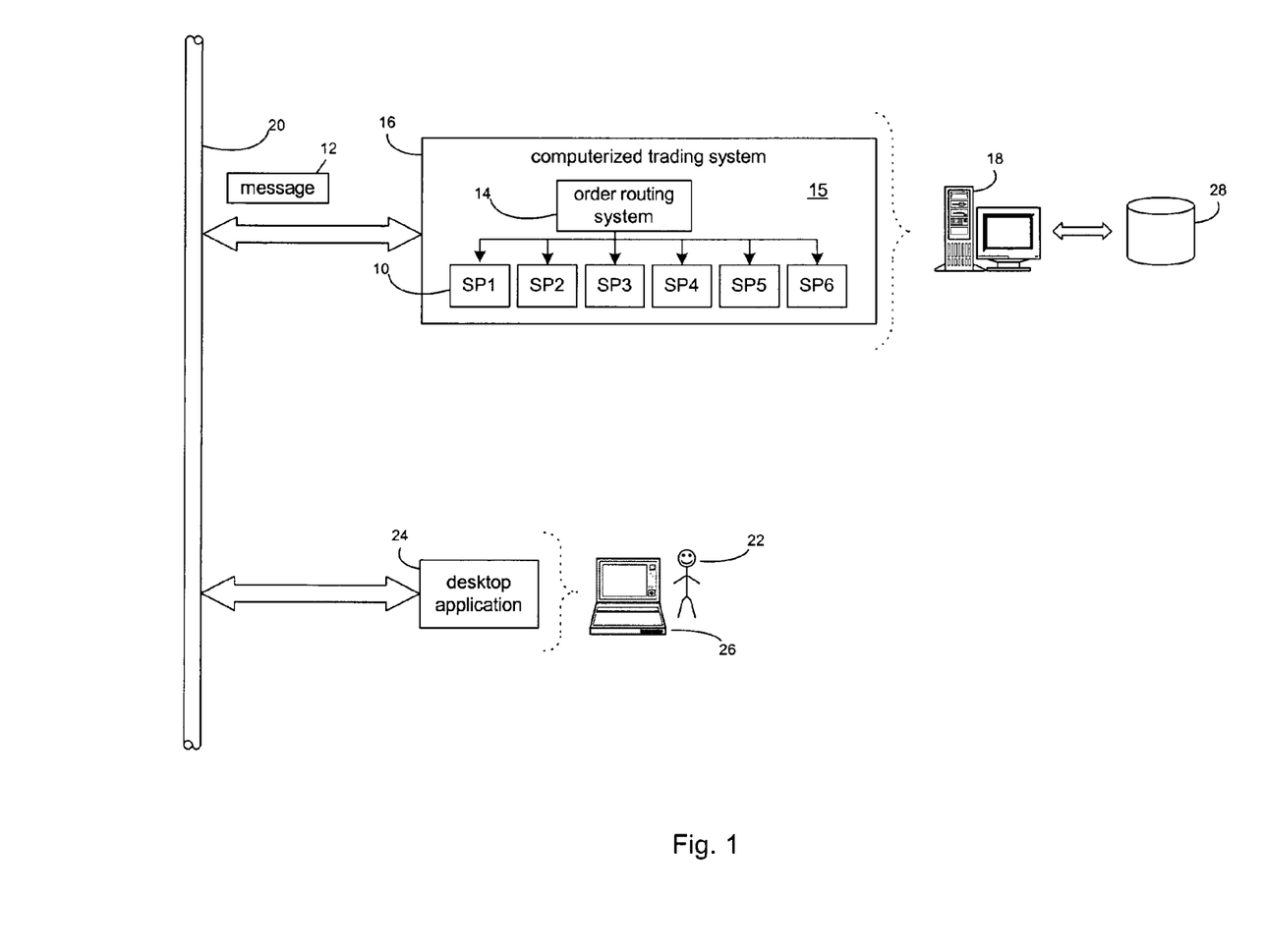
FIG. 1 is a block diagram of a parallel architecture including a securities processor and an order routing system.

Referring to FIG. 1, there is shown a securities processor 10 that processes attributable security interest messages 12 concerning a specific security received from a order routing system 14. Securities processor 10 and order routing system 14 form a multi-parallel architecture 15 that is incorporated into and part of a computerized trading system 16. Computerized trading system 16 trades securities including the specific security that is the subject of received message 12. The securities processor 10 processes the attributable security interest messages 12 and effectuates the trading of the security. By assigning certain securities to certain securities processors, a single securities processor is not required to process all of the attributable security interest messages 12 handled by the computerized trading system 16. Accordingly, the load distribution amongst the securities processors within the system can be controlled and the efficiency and throughput of the system can be enhanced.

Securities processor 10 and order routing system 14 reside on a server 18 that is connected to network 20 (e.g., the Internet, an intranet, a local area network, some other form of network, etc.). Computerized trading system 16, which trades securities electronically, processes trades (e.g., message 12) entered by various market participants (e.g., market participant 22). Market participant 22 typically accesses and uses computerized trading system 16 via a desktop application 24 (e.g., Microsoft Internet Explorer™, Netscape Navigator™, the Nasdaq Workstation II™, a specialized desktop interface, etc.) running on computer 26, thus allowing market participant 22 to trade securities with other market participants (not shown).

The instruction sets and subroutines of securities processor 10 and order routing system 14 are typically stored on a storage device 28 connected to server 18. Additionally, computerized trading system 16 stores all information relating to securities trades on storage device 28. Storage device 28 can be a hard disk drive, a tape drive, an optical drive, a RAID array, a random access memory (RAM), or a read-only memory (ROM), for example.

Server 18 includes at least one central processing unit (not shown) and main memory system (not shown). Typically, server 18 is a multi-processing, fault-tolerant system that includes multiple central processing units that each have a dedicated main memory system or share a common main memory pool. While being executed by the central processing unit(s) of server 18, order routing system 14 and multiple instantiations of securities processor 10 reside in the main memory system of server 18. Further, the processes and subroutines of securities processor 10 and order routing system 14 may also be present in various levels of cache memory incorporated into server 18.

Figure 2:
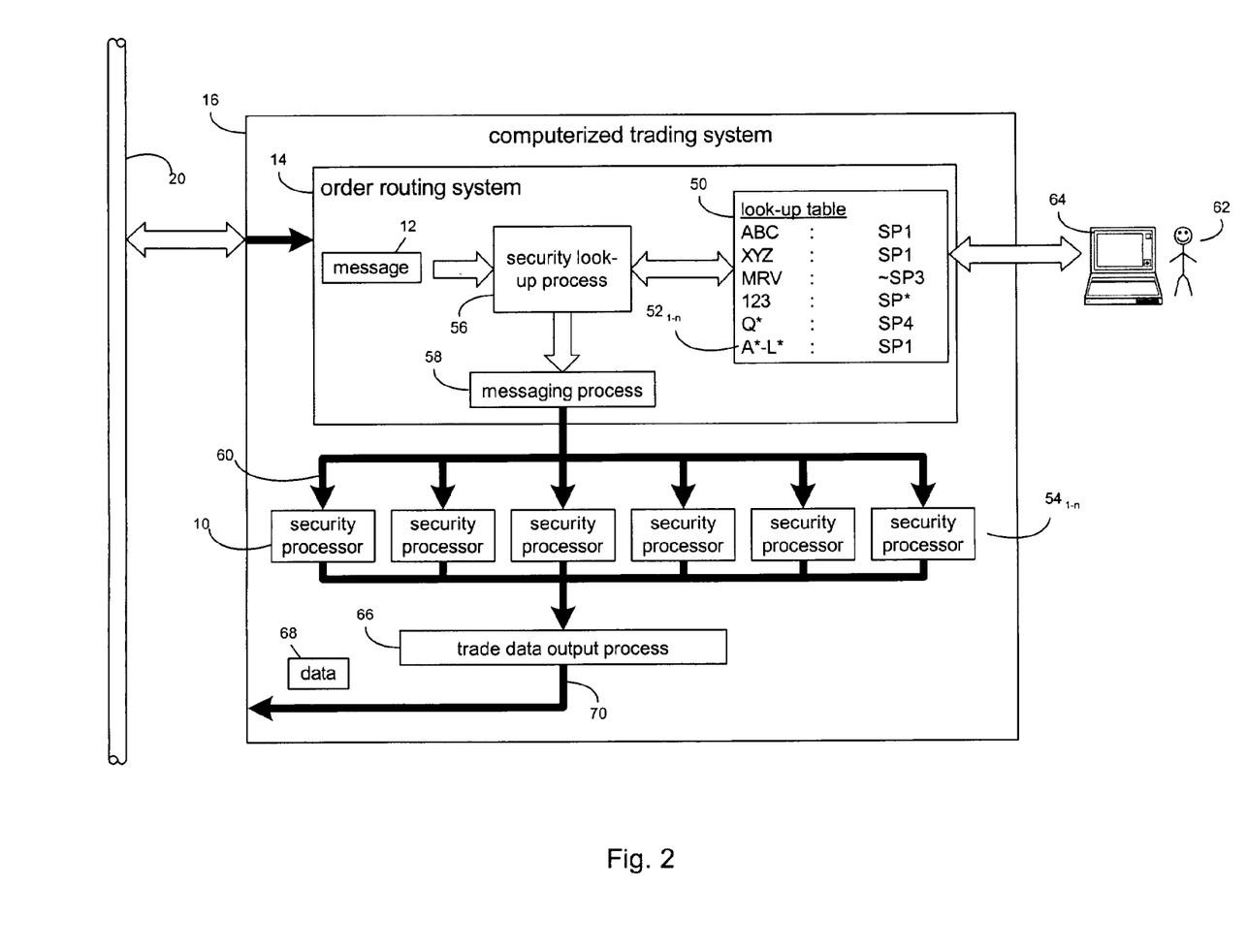
FIG. 2 is a block diagram of the order routing system of the parallel architecture.

Referring to FIG. 2, order routing system 14 includes a configurable look-up table 50 that includes assignment entries $52_{1-n}$ that assign each of the securities traded on computerized trading system 16 to one or more securities processors $54_{1-n}$ (e.g., securities processor 10). Look-up table 50 can be configured in various forms. For example, table 50 can be a multi-column, multi-row text-based ASCII (i.e., American Standard Code for Information Interchange) file that is accessed to determine the assigned securities processor. Alternatively, look-up table 50 may be a database from which a query is made concerning the security and the appropriate database record is retrieved, such that this database record specifies the securities processor to which that specific security is assigned. Other file arrangements/structures are also possible, such as a comma delimited text file.

During the course of the trading day and, possibly, before and after the trading day, market participants (e.g., market participant 22) place orders/quotes (e.g., message 12) for securities traded on computerized trading system 16. These orders/quotes, which are typically in the form of messages (e.g., message 12), include several pieces of information, such as: the name of the market participant who placed the order/quote; a symbol (or some other identifier) for the security being sought for purchase or offered for sale; and a quantity indicator concerning the number of shares sought for purchase or offered for sale, for example.

When a market participant 22 enters a message 12, this order/quote is transmitted to computerized trading system 16 via network 20. Upon receipt of message 12 by order routing system 14, a security look-up process 56 parses message 12 to determine the security to which the order/quote relates. Typically, security-look-up process 56 examines message 12 to find a ticker symbol (or some other identifier) for the security to which the order pertains. Assume that, for this example, message 12 pertains to one-hundred shares of XYZ Corp. that Market Participant A wishes to purchase for $17.00 per share. Security look-up process 56 parses this order and extracts the ticker symbol XYZ that is included in the message body. Alternatively, some other form of identifier can be used (e.g., a binary identifier) provided that assignment entries $52_{1-n}$ use these identifiers to assign the securities processors.

Security look-up process 56 accesses configurable look-up table 50 to determine the securities processor to which ticker symbol XYZ is assigned. As is shown in configurable lookup table 50, security XYZ is assigned to securities processor SP1. Depending on the structure of table 50 (e.g., ASCII table, database, text file, etc), security look up process 56 may scan table 50 (if it is an ASCII table or text file), or may launch a query (if it is a database) to determine which securities processor the security is assigned to. Once this determination is made, messaging process 58 populates the header of the message to include an identifier for the appropriate securities processor. Alternatively, if message 12 does not already include an empty header, the message may be appended to include a header that identifies the assigned securities processor. Once this process is complete, message 12 is broadcast over bus 60 to the assigned securities processor (securities processor 10, for example).

Figure 3:
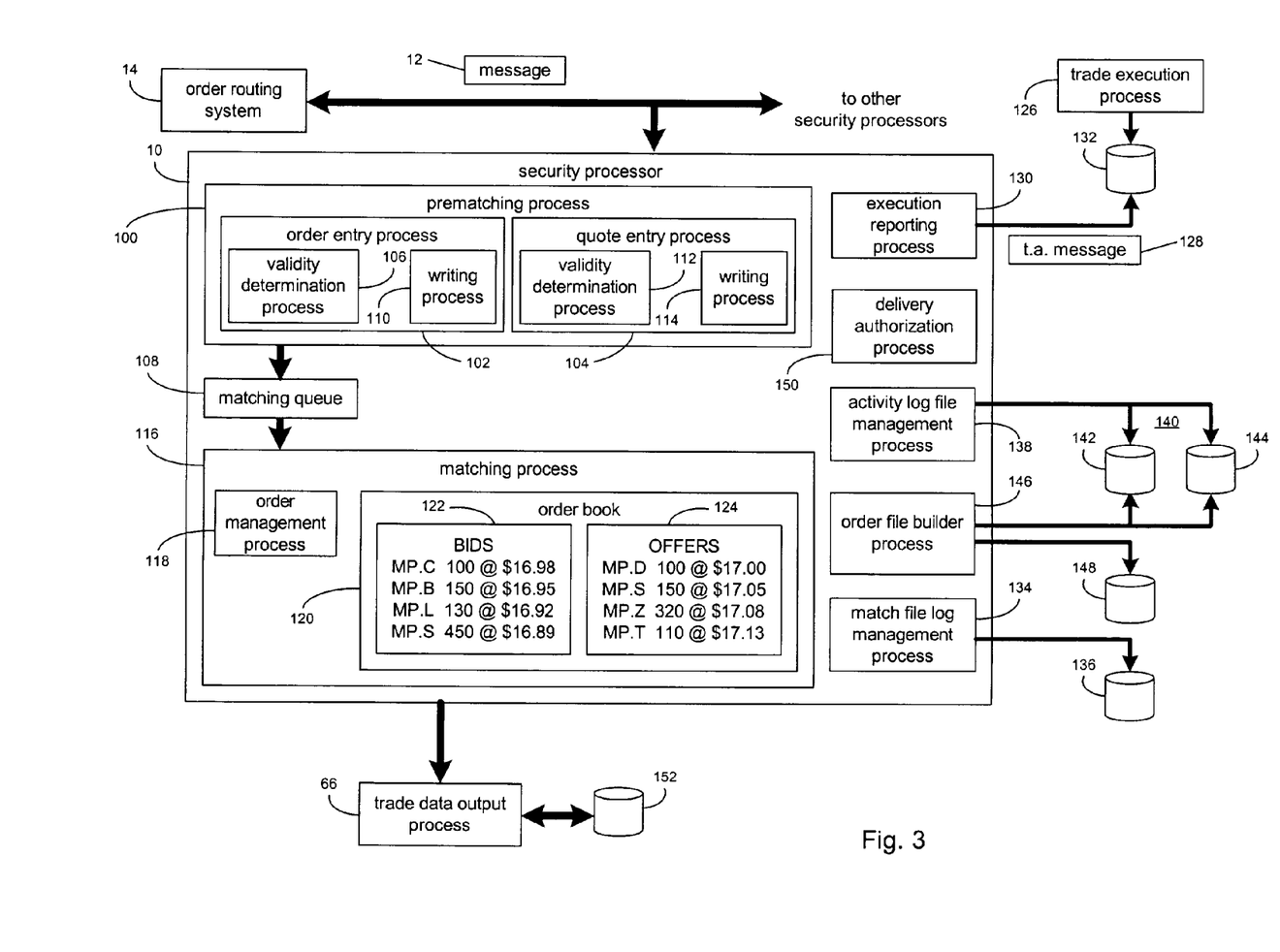
FIG. 3 is a block diagram of the securities processor of the parallel architecture.

Referring to FIG. 3, once message 12 is received by the securities processor 10, a check is performed by prematching process 100 to make sure that the order/quote passes certain preliminary checks (e.g., order eligibility, order syntax, etc.). The specifics of the checks being performed and the action taken in response to a failure is configured by administrator 62 using computer 64. Typically, if an order/quote fails any of these checks, the order is rejected and the market participant who placed the order is notified.

Prematching process 100 includes order entry process 102 and a quote entry process 104. If message 12 relates to an order that market participant 22 entered, order entry process 102 receives and processes the message 12. Order entry process 102 includes a validity determination process 106 that performs the preliminary checks described above. If the message passes these preliminary checks, this validated message is placed (i.e., written) into a matching queue 108 by a writing process 110.

Alternatively, if message 12 represents a quote, a quote entry process 104 receives and processes message 12. A validity determination process 112 receives and validates the quote. Once validated, the validated message is written into the matching queue 108 by writing process 114.

Matching queue 108 functions as a temporary storage area (i.e., a buffer) for those messages that were received and validated by the securities processor but not yet processed. Matching queue 108 also stores other pending orders, quotes, and supervisory commands for the securities assigned to the securities processor. Matching queue 108 is typically a first-in, first-out (FIFO) buffer, in which the messages wait in line to be processed. Matching queue 108 is typically configured in a non-volatile memory, such as storage device 28.

Once queued by matching queue 108, these messages/commands wait in line to be processed by matching process 116. When available, matching process 116 retrieves the next-inline message/command (message 12, for example) so that it could be processed.

As stated above, in this example, message 12 pertains to one-hundred shares of XYZ Corp. that Market Participant A wishes to purchase for $17.00 per share. This message, which represents a bid-to-buy XYZ Corp. (hereinafter a "bid"), will be entered into the order book 118 for securities processor 12 for subsequent matching with a corresponding offer-to-sell XYZ Corp (hereinafter an "offer").

Matching process 116 includes an order management process 118 for managing and maintaining the validated messages (such as message 12) received from matching queue 108. These validated messages are entered into an order book 120 that is exclusively controlled by the order management process 118 of matching process 116. Typically, order book 120 is stored in a portion of the main memory (not shown) of server 18 that is exclusively accessible by order management process 118.

Order book 120 includes of two logical portions, a bid-side portion 122 and an ask-side portion 124. Whenever a message is validated concerning a bid, the relevant information (e.g., market participant identifier, quantity of shares, bid price, etc.) pertaining to that message is placed into the bid-side portion 122 of order book 120. Conversely, whenever a message is validated concerning an offer, the relevant information (e.g., market participant identifier, quantity of shares, ask price, etc.) pertaining to that message is placed into the ask-side portion 124 of order book 120.

During the course of the day, the trade value of the security (XYZ Corp., for example) varies as market conditions fluctuate. Whenever a market participant is offering a security for sale at the same price that another market participant is willing to pay for the security, matching process 116 matches the bid and the offer. Once this match occurs, the trade can be executed by a trade execution process 126. However, if the highest-price (i.e., best price) bid is lower than the lowest-price (i.e., best price) offer, no match will occur and, therefore, the security will not be traded. These pending bids and offers will remain on that security's order book 120. This price differential between the lowest-price offer and the highest-price bid is commonly referred to as the "spread". For order book 120, the price spread is $0.02, as Market Participant C has a pending (i.e., unmatched) bid to buy one-hundred shares for $16.98 per share, and Market Participant D has a pending offer to sell one-hundred shares for $17.00 per share. Therefore, until something changes (i.e., Market Participant C raises their bid to $17.00, Market Participant D lowers their offer to $16.98, the two market participant meet at $16.99, or a third party makes a $17.00 bid or a $16.98 offer), no trades will occur.

Order management process 118 is configured so that if a supervisory command is retrieved from matching queue 108, order management process 118 executes that supervisory command. For example, if a "stop trading" command is received for all securities assigned to securities processor 10, order management process 118 will stop matching process 116 for all securities handled by that securities processor, effectively stopping all trading for that securities processor. If each securities processor simultaneously received the same supervisory command, all trading on computerized trading system 16 would cease. Further, if a "stop trading" command is received for a specific security assigned to securities processor 10, order management process 118 will shut down matching process 116 for that particular security while allowing any other matching processes being handled by securities processor 10 to continue.

Continuing with the above-stated example, when message 12 is retrieved from matching queue 108, as it is a bid to buy one-hundred shares of XYZ Corp. for $17.00 per share, it is placed into the bid-side 122 of order book 120. Once placed on order book 120, this unmatched bid is matched with an unmatched offer, namely the outstanding offer to sell one-hundred shares of XYZ Corp. for $17.00 per share that was placed by Market Participant D.

Assuming that neither of the two market participants involved in this match have requested a delivery notification (to be discussed below), a trade authorization message 128, which is generated by an execution reporting process 130, is transmitted to an execution trigger (i.e., a log file) 132 accessible by a trade execution process 126. Trade execution process 126 effectuates the trade by transferring ownership of the shares of XYZ Corp. from the seller's to the buyer's account, and transferring funds from the buyer's to the seller's account. Once a bid or an offer is matched, order management process 118 removes it from order book 120, as it is no longer available for matching.

A match file log management process 134 maintains a match log file 136 that itemizes the matches made by matching process 116. An activity log file management process 138 maintains an activity log file 140 that specifies the chronological changes made to the order book 120 by the order book management process 118. The activity log file 140 is typically split into two separate files or portions, an order log activity file 142 and a quote log activity file 144. Therefore, whenever changes are made to the order book 120 due to messages concerning orders, these changes are specified in the order log activity file 142. Conversely, whenever changes are made to the order book 120 due to messages concerning quotes, these changes are specified in the quote log activity file 144. Typically, the log activity files 142, 144 are appended each time a change is made to the order book 120 and, therefore, provide a chronological sequence of changes made to the order book 120 during the trading day. An order file builder process 146 accesses and uses the chronological information included in activity log files 142, 144 to build an order book recovery file 148 that is used to recreate/restore order book 120 in the event of a hardware or data failure on server 18.

This order book recovery file is assembled by examining the sequence of events chronicled on activity log files 142, 144 to determine if a bid or offer is still pending on the order book. For example, message 12 pertains to one-hundred shares of XYZ Corp. that Market Participant A wishes to purchase for $17.00 per share. When this unmatched bid was placed on order book 120, the order book was modified to include this bid. This unmatched bid was subsequently matched with an unmatched offer previously written to order book 120, namely the outstanding offer to sell one-hundred shares of XYZ Corp. for $17.00 per share that was placed by Market Participant D. Once this match occurred, the bid by Market Participant A and the offer by Market Participant D were both removed from order book 120. Therefore, the order activity log file 142 would indicate the following: an offer by Market Participant D was written to order book 120; a bid by Market Participant A was written to order book 120; and this bid and this offer were both subsequently removed from the order book 120. Accordingly, these four pieces of chronological information would be processed by order file builder process 146 when creating order book recovery file 148, which would show that the order book 120 does not currently contain either the offer made by Market Participant D or the bid made by Market Participant A.

As stated above, market participants may request that a delivery notification be sent to them prior to processing their bid/offer. For example, once matching process 116 matches an offer with a bid, the owner of the offer and/or the owner of the bid can be notified to request authorization to execute the trade. Therefore, when the match described above between Market Participant A and Market Participant D occurred, a delivery authorization process 150 may request from either or both of the market participants an authorization to have the trade effectuated. If either or both market participants requested this authorization, delivery authorization process 150 would request a transaction authorization from either or both of them. In this scenario, only once this transaction authorization is received by the securities processor will the trade authorization message 128 be sent to the execution trigger 132.

Whenever a match occurs, an order fails to match with another outstanding offer within a predetermined period of time (e.g., immediately, during the trading day, etc.), or an order is rejected by prematching process 100, a trade data output process 66 transmits trade data 68 to the market participant who placed the order. This trade data will vary depending on the action taken by securities processor 10. For example, if the order was rejected, the market participant will typically receive a message specifying that the order was rejected and the reasons for the rejection (e.g., negative volume, negative share price, etc.). If the order was executed, the market participant may receive a message specifying that the order was executed and defining the number of shares sold and the per-share price. If the order failed to execute, the message received by the market participant would typically specify the reason for the failure (e.g., order did not execute immediately, order did not execute by the close of trading, etc.). These notification messages are broadcast across output bus 70 which is connected to network 14.

Trade data output process 66 retrieves the information included in match log file 136 and log activity files 142, 144 from all of the securities processors in system 16 and creates an archive file 152. The trade data output process 66 is configured to respond to market participant queries of archive file 152 by retrieving the desired information from the archive file. In some implementations, archive file 152 is partitioned to increase access efficiency.

Administrator 62 (via computer 64 and a configuration utility running on it) can configure and reconfigure configurable look-up table 50 to vary the load distribution between the securities processors $54_{1-n}$ or the overall load of the computerized trading system 16. The manner in which table 50 is modified varies depending on the configuration of the table. If the table is an ASCII-based table or text file, a simple text or ASCII line editor may be used to assign and reassign securities to various securities processors. Alternatively, if table 50 is configured as a database, database editing/configuration software (such as that offered by Sybase®, Microsoft®, and Oracle®) may be used to add, delete, or modify records within the database.

As explained above, the matching of the orders and quotes placed by the market participants is handled by the securities processors incorporated into computerized trading system 16. The greater the number of securities processors employed, the greater the throughput of computerized trading system 16. Specifically, as the number of securities processors is increased, the number of matches that system 16 is capable of handling is also increased.

As would be expected, bigger well-know securities tend to be traded at higher volumes than smaller less-known securities. Accordingly, administrator 62 may assign one or more of their highest volume securities to a single securities processor, such that another securities processor handles all the remaining securities. Additionally, as the look-up table is reconfigurable, these definitions can be reassigned as trading trends vary. For example, assume that XYZ Corp. is the highest traded stock handled by computerized trading system 16 and, therefore, administrator 62 only assigned XYZ Corp. to the first of the six securities processors, such that the second through the sixth securities processors handle the trades of all other securities traded on the system 16. If, over time, XYZ Corp. starts to trade less frequently and ABC Corp. (another security traded on computerized trading system 16) becomes the highest traded security, administrator 62 could easily reassign XYZ Corp. so that it is processed by any of securities processors two through six, thus freeing up the first securities processor to exclusively process trades of ABC Corp.

Since additional securities processors can be added to system 16 to accommodate higher trade volumes, computerized trading system 16 is scalable. For example, if administrator 62 decided that the load level of all six securities processors were too high and, therefore, reassigning securities from one securities processor to another would not free up any bandwidth, a seventh securities processor can be added to system 16. This new securities processor would be given a unique address or identifier and look-up table 50 would be modified so that one or more securities are assigned to this newly-added securities processor. Additionally, as these securities processors are each autonomous processors that run separately and independently of each other, the new securities processor may be added and tested without jeopardizing the stability of computerized trading system 16. For example, a seventh securities processor may be added and, prior to this newly-added securities processor executing trades of actual securities, it can be tested. A batch test-procedure can be used to trade "test" securities to verify the securities processor's reliability prior to actually using the newly-added securities processor in the system. Once the reliability of the new securities processor is established, look-up table 50 can be modified to assign actual securities to that newly-added securities processor.

Concerning the types of assignment entries $52_{1-n}$ that are included in look-up table 50, these entries may be security-specific assignment entries; dedicated assignment entries; id-range assignment entries; or floating assignment entries, for example. Each of these will be discussed below in greater detail.

A security-specific assignment entry is an assignment entry that assigns a specific security (or security symbol) to a specific security processor. An example of a security-specific assignment entry is "XYZ:SP1", in that it assigns security XYZ Corp. to securities processor SP1. However, securities processor SP1 is available to also process trades concerning other securities.

A dedicated assignment entry is an assignment entry that assigns a security to a dedicated securities processor, such that this dedicated securities processor only processes trades concerning that one security. If look-up table 50 does not use wildcards (to be discussed below), every assignment would function as a dedicated assignment until a second security was assigned to the same security processor. An example of this type of dedicated assignment would be "MRV:SP3", since no other security is assigned to securities processor SP3. However, if assignment entries are made that utilize wildcards (to be discussed below), the dedicated assignment entry would have to indicate that the securities processor is exclusively assigned. An example of this type of dedicated assignment is "MRV:~SP3", such that the "~" prefix before the SP3 would be indicative of the exclusivity and, therefore, prevent wildcard assignments from assigning any other securities to securities processor SP3.

An id-range assignment entry is an assignment entry that assigns a range of securities to a specific securities processor. For example, securities beginning with the letters A-L may be assigned to securities processor SP1. The corresponding id-range assignments is "A*-L*:SP1". Note the use of the wildcard symbol "*" to identify any combination beginning with a certain character. Further, these id-range assignments may specify a range of securities beginning with certain numbers, such as "1*-9*:SP3".

A floating assignment entry is an entry that assigns a specific security to anyone of a range of securities processors. For example, security "123" may be assigned to the next-available securities processor. Typically, this type of assignment is performed on lower-priority, lightly-traded securities. An example of this type of floating assignment is "123:SP*", such that the wildcard character is used to represent the securities processor assignment. Note that if such wildcard securities processor assignments are used, any dedicated assignment would have to indicate exclusivity for a securities processor to avoid a floating assignment assigning a security to a dedicated securities processor.

Figure 4:
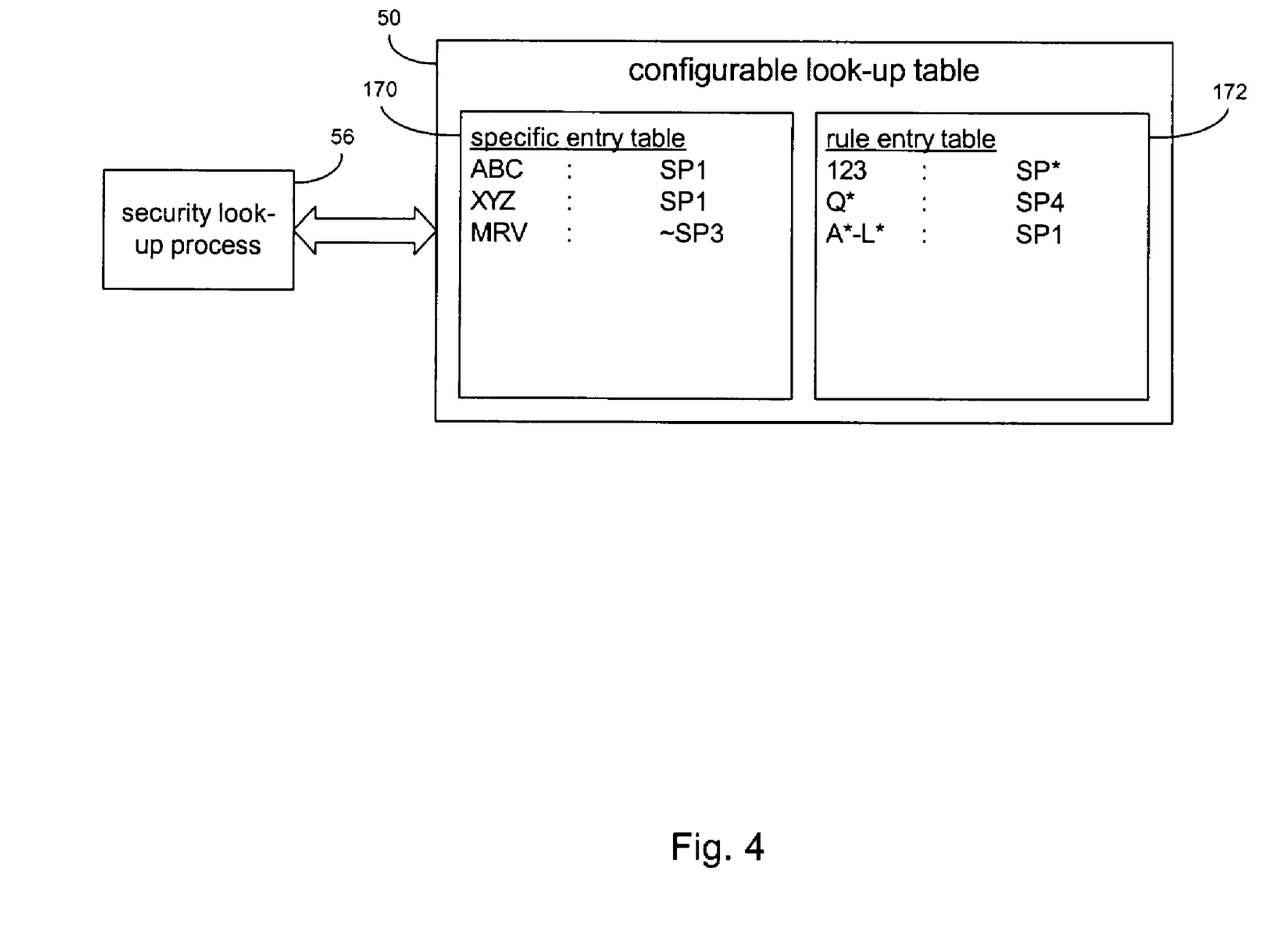
FIG. 4 is a block diagram of a configurable look-up table used by the order routing system of the parallel architecture.

Referring to FIG. 4, look-up table 50 may be configured to include a specific-entry table 170 and a rule-entry table 172. Specific entry table 170 includes security-specific assignment entries (e.g., XYZ:SP1) and dedicated assignment entries (e.g., MRV:~SP3). Rule entry table 172 includes id-range assignment entries (e.g., A*-L*:SP1) and floating assignment entries (e.g., 123:SP*).

If look-up table 50 is configured to include a specific entry table 170 and a rule entry table 172, security look-up process 56 is configured to first access and search the specific entry table 170 to determine if it includes an assignment entry for the security associated with a received attributable security interest message. If table 170 includes such an entry, security lookup process 56 will stop searching table 50. However, if table 170 does not include such an entry, security look-up process 56 will access and search rule-entry table 172 to determine if it includes an assignment entry for the security associated with the received attributable security interest message.

While FIGS. 1 and 2 are shown to include six securities processors, the actual number of securities processors varies depending on, among other things, system loading and trade volume of computerized trading system 16.

While specific examples were given concerning security-specific assignment entries, dedicated assignment entries, id-range assignment entries, and floating assignment entries, the structure and nomenclature of these entries is for illustrative purposes only. Specifically, administrator 62 and/or the designer of system 16 may choose a nomenclature or syntax that is different than the above-stated examples.

Figure 5A:
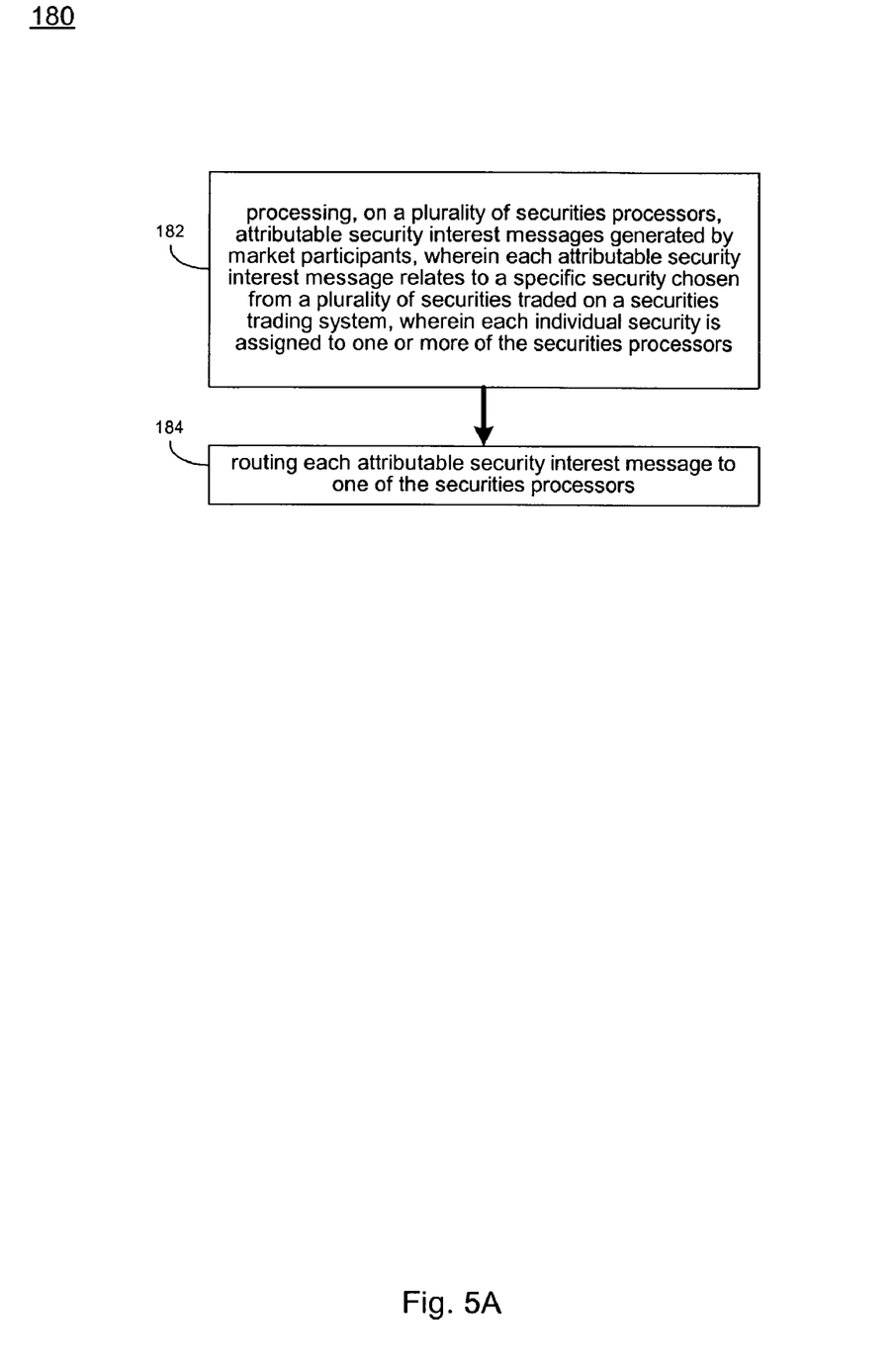
FIGS. 5A, 5B, and 5C are block diagrams of a parallel processing method.

Referring to FIG. 5A, a parallel processing process 180 includes processing 182, on a plurality of securities processors, attributable security interest messages generated by market participants. Each attributable security interest message relates to a specific security chosen from a plurality of securities traded on a securities trading system, such that each individual security is assigned to one or more of the securities processors. Parallel processing method 180 includes routing 184 each attributable security interest message to one of the securities processors.

Figure 5B:
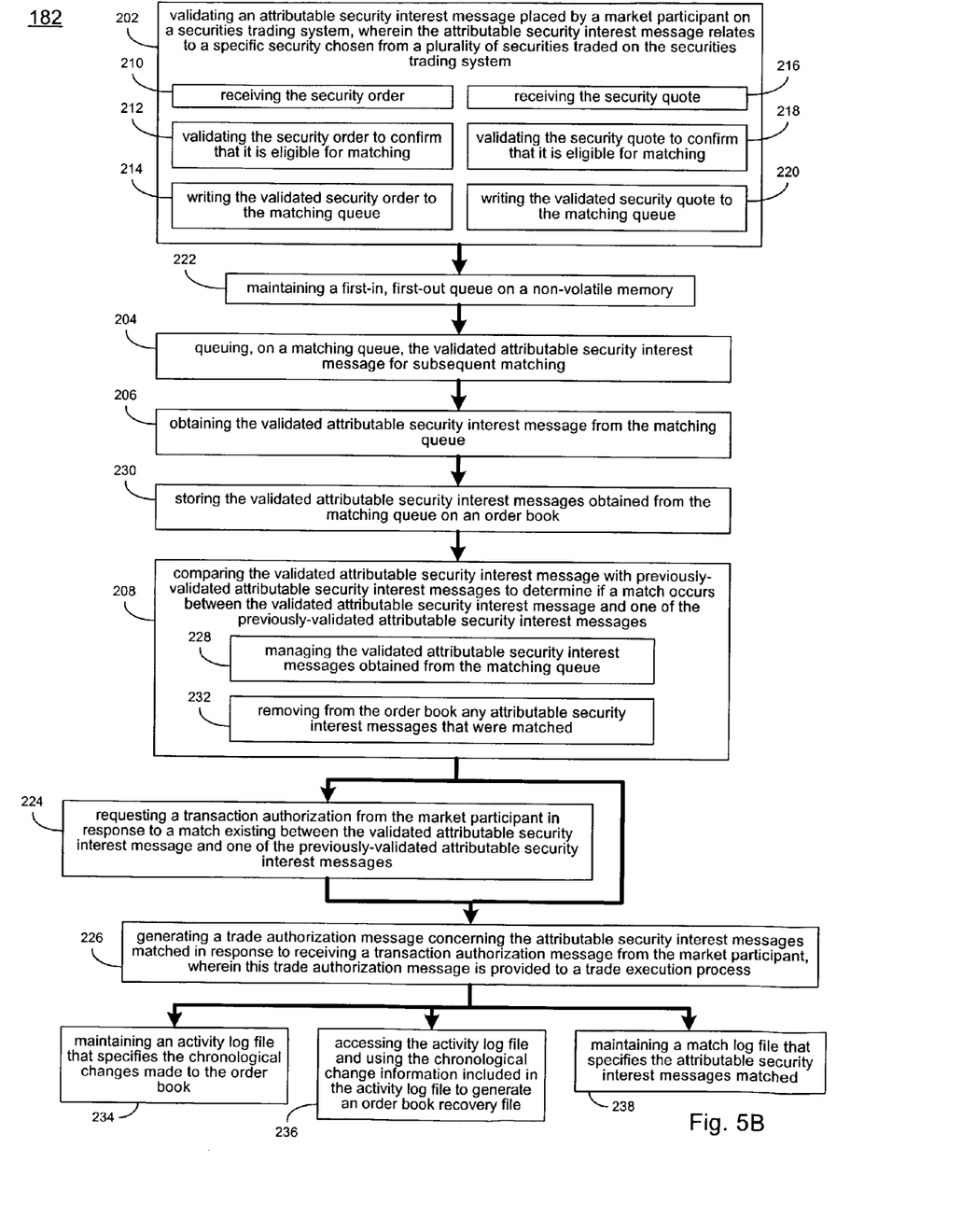

Referring to FIG. 5B, processing 182 attributable security interest messages generated by market participants includes validating 202 an attributable security interest message placed by a market participant on a securities trading system. This attributable security interest message relates to a specific security chosen from a plurality of securities traded on the securities trading system.

The validated attributable security interest message is queued 204, on a matching queue, for subsequent matching. The validated attributable security interest message is then obtained 206 from the matching queue, and compared 208 with previously-validated attributable security interest messages to determine if a match occurs between it and one of the previously-validated attributable security interest messages.

The attributable security interest message is a security order and validating 202 includes receiving 210 the security order, and validating 212 it to confirm that it is eligible for matching. Validating 202 further includes writing 214 the validated security order to the matching queue.

The attributable security interest message is a security quote and validating 202 includes receiving 216 the security quote, and validating 218 it to confirm that it is eligible for matching. Validating 202 further includes writing 220 the validated security quote to the matching queue.

The matching queue is a first-in, first-out queue maintained 222 on a non-volatile memory.

A transaction authorization is requested 224 from the market participant whenever a match exists between the validated attributable security interest message and one of the previously-validated attributable security interest messages. A trade authorization message is generated 226 concerning the matched attributable security interest messages in response to receiving a transaction authorization message from the market participant. This trade authorization message is provided to a trade execution process.

The validated attributable security interest messages obtained from the matching queue are managed 228. The validated attributable security interest messages obtained from the matching queue are stored 230 on an order book. Any attributable security interest messages that were matched are removed 232 from the order book. An activity log file is maintained 234 that specifies the chronological changes made to the order book. The chronological change information included in the activity log file is accessed 236 and used to generate an order book recovery file. A match log file is maintained 238 that specifies the attributable security interest messages that were matched.

Figure 5C:
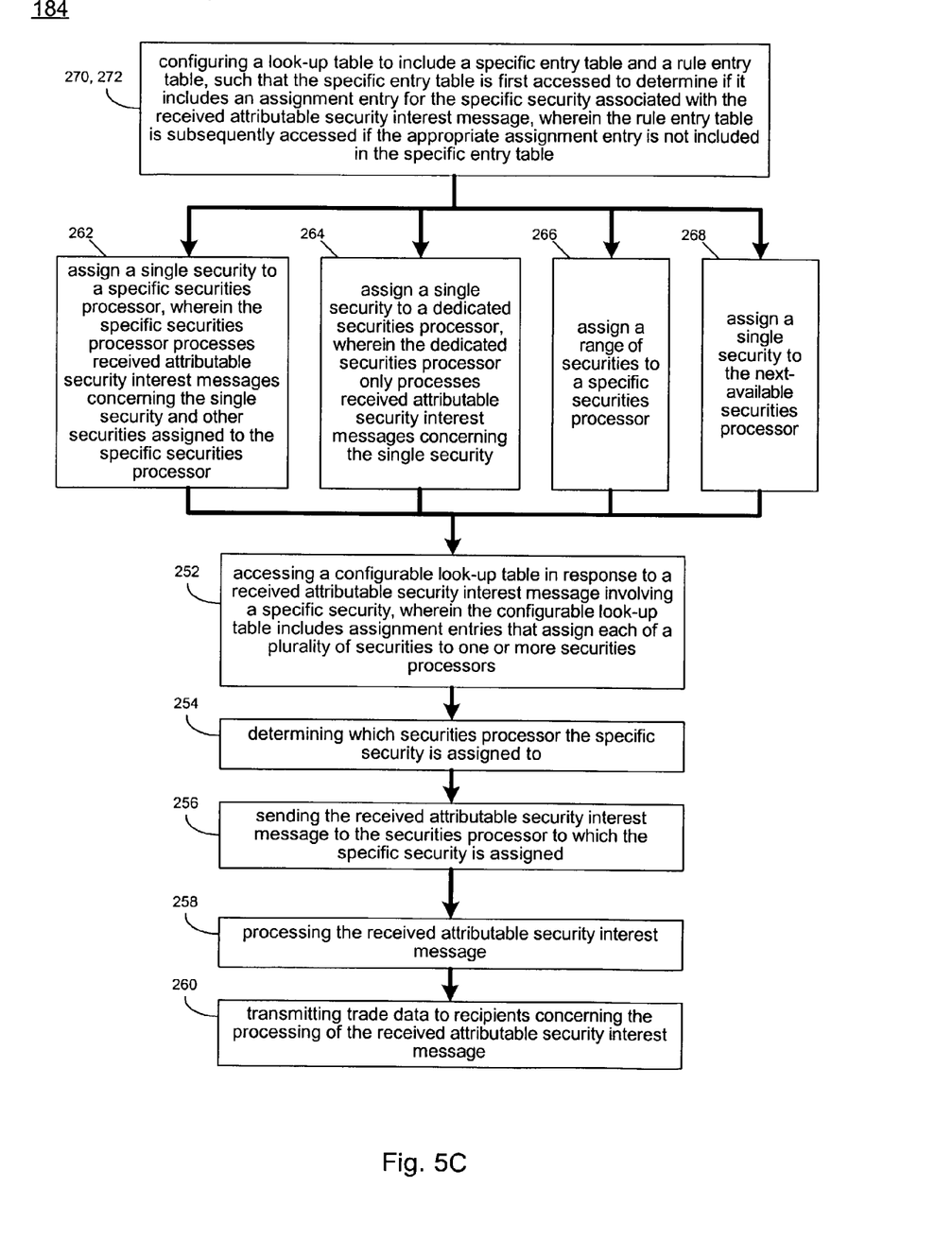

Referring to FIG. 5C, routing 184 each attributable security interest message to one of the securities processors includes accessing 252 a configurable look-up table in response to a received attributable security interest message involving a specific security. The configurable look-up table includes assignment entries that assign each of a plurality of securities to one or more securities processors. A determination 254 is made concerning the securities processor that the specific security is assigned to. The received attributable security interest message is sent 256 to the securities processor to which the specific security is assigned.

The received attributable security interest message is processed 258 and trade data concerning the processing of the received attributable security interest message is transmitted 260 to recipients. This trade data includes a share volume and a share price.

The assignment entries include security-specific entries that assign 262 a single security to a specific securities processor, such that the specific securities processor processes received attributable security interest message concerning the single security and other securities assigned to the specific securities processor. The assignment entries include dedicated entries that assign 264 a single security to a dedicated securities processor, such that the dedicated securities processor only processes received attributable security interest message concerning the single security. The assignment entries include id-range entries that assign 266 a range of securities to a specific securities processor. The assignment entries include floating entries that assign 268 a single security to the next-available securities processor.

The configurable look-up table includes a specific entry table and a rule entry table. The specific entry table is first access 270 to determine if it includes an assignment entry for the specific security associated with the received attributable security interest message. If it doesn't, the rule entry table is subsequently accessed 272.

The specific entry table includes the security-specific entries and the dedicated entries, and the rule entry table includes the id-range entries and the floating entries.

The multi-parallel architecture described herein is not limited to the hardware embodiment described above; it may find applicability in any computing or processing environment. The multi-parallel architecture may be implemented in hardware, software, or a combination of the two. For example, the multi-parallel architecture may be implemented using circuitry, such as one or more of programmable logic (e.g., an ASIC), logic gates, a processor, and a memory.

The multi-parallel architecture may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The multi-parallel architecture may also be implemented as a machine-readable storage medium, configured with a computer program, where, upon execution, instructions in the computer program cause a machine to operate to perform the functions of the multi-parallel architecture described above.

Embodiments of the multi-parallel architecture may be used in a variety of applications. Although the multi-parallel architecture is not limited in this respect, the multi-parallel architecture may be implemented with memory devices in microcontrollers, general purpose microprocessors, digital signal processors (DSPs), reduced instruction-set computing (RISC), and complex instruction-set computing (CISC), among other electronic components.

Embodiments of the multi-parallel architecture may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A system for securities trading, the system comprising:
a plurality of securities processors for processing attributable security interest messages generated by market participants, the attributable security interest messages relate to securities traded on the securities trading system, each security is assigned to one or more of the securities processors based on a unique security identifier associated with the security; and
an order routing system for routing each attributable security interest message to one of the securities processors according to the assignment.

2. The system of claim 1 wherein each securities processor includes a prematching process for validating an attributable security interest message placed by a market participant and with the security identifier being a ticker symbol.

3. The system of claim 2 wherein each securities processor includes a matching queue for receiving the validated attributable security interest message from the prematching process and for queuing the validated attributable security interest message for subsequent matching.

4. The system of claim 3 wherein the matching queue is a first-in, first-out queue maintained on a non-volatile memory.

5. The system of claim 3 wherein the attributable security interest message is a security order and the prematching process includes an order entry process, the order entry process including a validity determination process for receiving the security order, and validating the security order to confirm that it is eligible for matching.

6. The system of claim 5 wherein the order entry process includes an order writing process for writing the validated security order to the matching queue.

7. The system of claim 3 wherein the attributable security interest message is a security quote and the prematching process includes a quote entry process, the quote entry process including a validity determination process for receiving the security quote, and validating the security quote to confirm that it is eligible for matching.

8. The system of claim 7 wherein the quote entry process stores the validated security quote to the matching queue.

9. The system of claim 2 wherein each securities processor includes a matching process for obtaining the validated attributable security interest message from the matching queue and for comparing it with previously-validated attributable security interest messages to determine if a match occurs between the validated attributable security interest message and one of the previously-validated attributable security interest messages.

10. The system of claim 9 wherein each securities processor includes a delivery authorization process, responsive to the matching process determining that a match exists between the validated attributable security interest message and one of the previously-validated attributable security interest messages, for requesting a transaction authorization from the market participant.

11. The system of claim 10 wherein each securities processor includes an execution reporting process, responsive to the delivery authorization process receiving a transaction authorization message from the market participant, for generating a trade authorization message concerning the attributable security interest messages matched by the matching process, wherein this trade authorization message is provided to a trade execution process.

12. The system of claim 9 wherein the matching process includes an order management process for managing the validated attributable security interest messages obtained from the matching queue.

13. The system of claim 12 wherein the attributable security interest message is a supervisory command and the order management process is configured to process supervisory commands.

14. The system of claim 12 wherein the matching process includes an order book, responsive to the order management process, for storing the validated attributable security interest messages obtained from the matching queue.

15. The system of claim 14 wherein the order book is maintained on a main memory device and is exclusively accessible by the order management process.

16. The system of claim 14 wherein the order management process is configured to remove from the order book any attributable security interest messages that were matched by the matching process.

17. The system of claim 14 wherein each securities processor includes an activity log file management process, responsive to the order management process, for maintaining an activity log file that specifies the chronological changes made to the order book by the order management process.

18. The system of claim 17 wherein each securities processor includes an order file builder process for accessing the activity log file, wherein the order file builder process uses the chronological change information included in the order activity log file to generate an order book recovery file.

19. The system of claim 12 wherein each securities processor includes a match log file management process, responsive to the order management process, for maintaining a match log file that specifies the matches made by the matching process.

20. The system of claim 1 wherein the order routing system includes a configurable look-up table that includes assignment entries including the unique identifier to assign each of a plurality of securities to one or more securities processors in the system according to the unique identifier.

21. The system of claim 20 wherein the order routing system includes a security look-up process for accessing the configurable look-up table in response to a received attributable security interest message involving a specific security to determine which securities processor the specific security is assigned to.

22. The system of claim 21 wherein the order routing system includes a messaging process, responsive to the security look-up process, for sending the received attributable security interest message to the securities processor to which the specific security is assigned.

23. The system of claim 20 wherein the assignment entries include security-specific entries including the unique identifier that assign a single security to a specific securities processor, with the specific securities processor processing received attributable security interest messages concerning the single security and other securities assigned to the specific securities processor.

24. The system of claim 20 wherein the assignment entries include dedicated entries including the unique identifier that assign a single security to a dedicated securities processor, with the dedicated securities processor processing only received attributable security interest messages concerning the single security.

25. The system of claim 20 wherein the assignment entries include id-range entries including unique identifiers that assign a range of securities to a specific securities processor according to the id-range entries.

26. The system of claim 20 wherein the assignment entries include floating entries including the unique identifier that assign a single security to the next-available securities processor.

27. The system of claim 20 wherein the configurable look-up table includes a specific entry table and a rule entry table.

28. The system of claim 27 wherein the specific entry table includes one or more security-specific entries that assign a single security to a specific securities processor, with the specific securities processor processing received attributable security interest messages concerning the single security and other securities assigned to the specific securities processor.

29. The system of claim 27 wherein the specific entry table includes one or more dedicated entries including the unique identifier that assign a single security to a dedicated securities processor, with the dedicated securities processor processing only received attributable security interest messages concerning the single security.

30. The system of claim 27 wherein the rule entry table includes one or more id-range entries including the unique identifier that assign a range of securities to a specific securities processor.

31. The system of claim 27 wherein the rule entry table includes one or more floating entries including the unique identifier that assign a single security to the next-available securities processor.

32. The system of claim 27 wherein the security look-up process is configured to first access the specific entry table to determine if the specific entry table includes an assignment entry for the specific security associated with the received attributable security interest message, wherein the rule entry table is subsequently accessed if the appropriate assignment entry is not included in the specific entry table.

33. The system of claim 1 further comprising a trade data output process, responsive to the securities processor processing the received attributable security interest message, for transmitting trade data to recipients concerning the processing of the received attributable security interest message.

34. A computer-implemented method comprising:
processing attributable security interest messages generated by market participants on a plurality of securities processors of a server computer, the attributable security interest messages relate to securities traded on a securities trading system, with each individual security assigned to one or more of the securities processors based on a unique security identifier associated with the security; and
routing, through an order routing system, each attributable security interest message to one of the securities processors according to the assignment.

35. The method of claim 34 wherein processing attributable security interest messages includes validating an attributable security interest message placed by a market participant.

36. The method of claim 35 wherein processing attributable security interest messages includes queuing, on a matching queue, the validated attributable security interest message for subsequent matching.

37. The method of claim 36 wherein the matching queue is a first-in, first-out queue maintained on a non-volatile memory.

38. The method of claim 36 wherein the attributable security interest message is a security order and validating the attributable security interest message includes:
receiving the security order; and
validating the security order to confirm that it is eligible for matching.

39. The method of claim 38 wherein validating the attributable security interest message further includes writing the validated security order to the matching queue.

40. The method of claim 36 wherein the attributable security interest message is a security quote and validating the attributable security interest message includes:
receiving the security quote; and
validating the security quote to confirm that it is eligible for matching.

41. The method of claim 40 wherein validating the attributable security interest message further includes writing the validated security quote to the matching queue.

42. The method of claim 36 wherein processing attributable security interest messages includes obtaining the validated attributable security interest message from the matching queue.

43. The method of claim 42 wherein processing attributable security interest messages includes comparing the validated attributable security interest message with previously-validated attributable security interest messages to determine if a match occurs between the validated attributable security interest message and one of the previously-validated attributable security interest messages.

44. The method of claim 43 wherein processing attributable security interest messages includes requesting a transaction authorization from the market participant in response to a match existing between the validated attributable security interest message and one of the previously-validated attributable security interest messages.

45. The method of claim 44 wherein processing attributable security interest messages includes generating a trade authorization message concerning the attributable security interest messages matched in response to receiving a transaction authorization message from the market participant, wherein this trade authorization message is provided to a trade execution process.

46. The method of claim 43 wherein comparing the validated attributable security interest message includes managing the validated attributable security interest messages obtained from the matching queue.

47. The method of claim 46 wherein the attributable security interest message is a supervisory command.

48. The method of claim 46 wherein processing attributable security interest messages includes storing the validated attributable security interest messages obtained from the matching queue on an order book.

49. The method of claim 46 wherein managing the validated attributable security interest messages is configured to remove from the order book any attributable security interest messages that were matched.

50. The method of claim 46 wherein processing attributable security interest messages includes maintaining an activity log file that specifies the chronological changes made to the order book.

51. The method of claim 50 wherein processing attributable security interest messages includes accessing the activity log file and using the chronological change information included in the activity log file to generate an order book recovery file.

52. The method of claim 43 wherein processing attributable security interest messages includes maintaining a match log file that specifies the attributable security interest messages matched.

53. The method of claim 34 wherein routing each attributable security interest message includes accessing a configurable look-up table in response to a received attributable security interest message involving an individual security, wherein the configurable look-up table includes assignment entries that assign each of a plurality of securities to one or more securities processors.

54. The method of claim 53 wherein routing each attributable security interest message includes determining which securities processor the specific security is assigned to.

55. The method of claim 54 wherein routing each attributable security interest message includes sending the received attributable security interest message to the securities processor to which the specific security is assigned.

56. The method of claim 55 further comprising transmitting trade data to recipients concerning the processing of the received attributable security interest message.

57. The method of claim 53 wherein the assignment entries include security-specific entries including the unique identifier that assign a single security to a specific securities processor, with the specific securities processor processing received attributable security interest messages concerning the single security and other securities assigned to the specific securities processor.

58. The method of claim 53 wherein the assignment entries include dedicated entries including the unique identifier that assign a single security to a dedicated securities processor, with the dedicated securities processor processing only received attributable security interest messages concerning the single security.

59. The method of claim 53 wherein the assignment entries include id-range entries including the unique identifier that assign a range of securities to a specific securities processor.

60. The method of claim 53 wherein the assignment entries include floating entries including the unique identifier that assign a single security to the next-available securities processor.

61. The method of claim 53 wherein the configurable look-up table includes a specific entry table and a rule entry table.

62. The method of claim 61 wherein the specific entry table includes one or more security-specific entries including the unique identifier that assign a single security to a specific securities processor, with this specific securities processor processing received attributable security interest messages concerning the single security and other securities assigned to the specific securities processor.

63. The method of claim 61 wherein the specific entry table includes one or more dedicated entries including the unique identifier that assign a single security to a dedicated securities processor, with the dedicated securities processor processing only received attributable security interest messages concerning the single security.

64. The method of claim 61 wherein the rule entry table includes one or more id-range entries including the unique identifier that assign a range of securities to a specific securities processor.

65. The method of claim 61 wherein the rule entry table includes one or more floating entries including the unique identifier that assign a security to the next-available securities processor.

66. The method of claim 61 further comprising first accessing the specific entry table to determine if the specific entry table includes an assignment entry for the specific security associated with the received attributable security interest message, wherein the rule entry table is subsequently accessed if the appropriate assignment entry is not included in the specific entry table.

67. A computer program product residing on a computer readable storage device for processing of messages for trading of securities in an electronic trading venue, the computer program product comprising instructions which, when executed by the processor, cause that processor to:
    process, on a plurality of securities processors, attributable security interest messages generated by market participants, each attributable security interest message having a unique security identifier that identifies that message as pertaining to a specific security of a plurality of securities traded on a securities trading system, wherein each individual security is assigned to one or more of the securities processors based on the unique security identifier; and
    route a received attributable security interest message to one of a plurality of processors, according to an pre-configured, assignment of processors for processing of the security interest message based on an unique security identifier.

68. The computer program product of claim 67 wherein instructions to route includes instructions to determine which processor of the plurality of processors the specific security is assigned to.

69. The computer program product of claim 67 wherein routing each attributable security interest message includes instructions to:
    access a configurable look-up table in response to an attributable security interest message involving a specific security, wherein the configurable look-up table includes assignment entries that assign each of a plurality of securities to one or more securities processors;
    determine which securities processor the specific security is assigned to; and
    send the received attributable security interest message to the securities processor to which the specific security is assigned.

70. The computer program product of claim 69 wherein the assignment entries include security-specific entries including the unique identifier that assign a single security to a specific securities processor, with the specific securities processor processing received attributable security interest messages concerning the single security and other securities assigned to the specific securities processor.

71. The computer program product of claim 69 wherein the assignment entries include dedicated entries including the unique identifier that assign a single security to a dedicated securities processor, with the dedicated securities processor processing only received attributable security interest messages concerning the single security.

72. The computer program product of claim 69 wherein the assignment entries include id-range entries including the unique identifier that assign a range of securities to a specific securities processor.

73. The computer program product of claim 69 wherein the assignment entries include floating entries including the unique identifier that assign a single security to the next-available securities processor.

74. The computer program product of claim 69 wherein the configurable look-up table includes a specific entry table and a rule entry table.

75. The computer program product of claim 74 wherein the specific entry table includes one or more security-specific entries including the unique identifier that assign a single security to a specific securities processor, with this specific securities processor processing received attributable security interest messages concerning the single security and other securities assigned to the specific securities processor.

76. The computer program product of claim 74 the specific entry table includes one or more dedicated entries including the unique identifier that assign a single security to a dedicated securities processor, with the dedicated securities processor processing only received attributable security interest messages concerning the single security.

* * * * *